(12) United States Patent
Wilkins et al.

(10) Patent No.: US 11,118,316 B2
(45) Date of Patent: Sep. 14, 2021

(54) THERMOPLASTIC COMPOSITION FOR SEALING ROADWAY JOINTS

(71) Applicant: Ennis Paint, Inc., Thomasville, NC (US)

(72) Inventors: Vincent Wilkins, Greensboro, NC (US); Maxwell Heavner, Greensboro, NC (US); Paul Seropian, Salisbury, NC (US); Scott Williams, Charlestown, IN (US); Scott Seeley, High Point, NC (US); Mark Kennedy, Springdale, AR (US)

(73) Assignee: ENNIS-FLINT, INC., Greensboro, NC (US)

( * ) Notice: Subject to any disclaimer, the term of this patent is extended or adjusted under 35 U.S.C. 154(b) by 35 days.

(21) Appl. No.: 16/018,504

(22) Filed: Jun. 26, 2018

(65) Prior Publication Data

US 2018/0371704 A1 Dec. 27, 2018

Related U.S. Application Data

(60) Provisional application No. 62/525,035, filed on Jun. 26, 2017.

(51) Int. Cl.
| | | |
|---|---|---|
| *C08L 77/00* | (2006.01) | |
| *E01C 11/10* | (2006.01) | |
| *C08L 23/06* | (2006.01) | |
| *C08K 3/04* | (2006.01) | |
| *C08L 77/02* | (2006.01) | |
| *C08L 93/04* | (2006.01) | |
| *C09D 177/00* | (2006.01) | |
| *C08L 77/10* | (2006.01) | |
| *C08L 77/04* | (2006.01) | |
| *C08L 77/06* | (2006.01) | |
| *E01C 23/09* | (2006.01) | |

(52) U.S. Cl.
CPC ............ *E01C 11/103* (2013.01); *C08K 3/04* (2013.01); *C08L 23/06* (2013.01); *C08L 77/00* (2013.01); *C08L 77/02* (2013.01); *C08L 77/04* (2013.01); *C08L 77/06* (2013.01); *C08L 77/10* (2013.01); *C08L 93/04* (2013.01); *C09D 177/00* (2013.01); *C08L 2205/03* (2013.01); *C08L 2207/04* (2013.01); *C08L 2555/80* (2013.01); *E01C 23/0973* (2013.01)

(58) Field of Classification Search
CPC ... C09D 177/00; E01C 23/0973; C08L 77/06; C08L 77/10; C08L 93/04
USPC ............... 523/150, 152, 154, 155, 156, 157
See application file for complete search history.

(56) References Cited

U.S. PATENT DOCUMENTS

| | | | |
|---|---|---|---|
| 2,689,801 A | 9/1954 | D'Alelio | |
| 3,005,790 A | 10/1961 | Wynn et al. | |
| 3,240,132 A | 3/1966 | Wiswell | |
| 3,459,106 A | 8/1969 | Johnson | |
| 4,105,808 A | 8/1978 | McKenzie | |
| 4,324,711 A | 4/1982 | Tanaka et al. | |
| 4,373,670 A | 2/1983 | Kilner | |
| 5,536,569 A | 7/1996 | Lasch et al. | |
| 6,412,957 B1 | 7/2002 | Oba | |
| 6,552,110 B1 | 4/2003 | Yalvac et al. | |
| 6,624,232 B2* | 9/2003 | Wilson, Sr. ............. | C04B 28/04 523/150 |
| 7,753,616 B2 | 7/2010 | Greer et al. | |
| 7,795,366 B2* | 9/2010 | Yang ........................ | C08K 5/01 526/348 |
| 8,573,882 B2 | 11/2013 | Greer et al. | |
| 9,260,636 B2* | 2/2016 | Coffey ............... | C09J 123/0869 |
| 9,790,372 B1 | 10/2017 | Greer et al. | |
| 9,932,476 B2* | 4/2018 | Kugel ..................... | C08L 77/00 |
| 1,021,464 A1 | 2/2019 | Greer et al. | |
| 2003/0156901 A1 | 8/2003 | Britt | |
| 2004/0127614 A1* | 7/2004 | Jiang ....................... | C08F 10/00 524/270 |
| 2005/0014912 A1 | 1/2005 | Hirota et al. | |
| 2007/0244264 A1 | 10/2007 | Granger et al. | |
| 2007/0253772 A1 | 11/2007 | Kubo et al. | |
| 2009/0067924 A1 | 3/2009 | Kaul | |
| 2010/0055374 A1 | 3/2010 | Greer et al. | |
| 2010/0210745 A1 | 8/2010 | McDaniel | |
| 2011/0123769 A1 | 5/2011 | Greer et al. | |
| 2011/0123770 A1 | 5/2011 | Greer et al. | |
| 2011/0262747 A1 | 10/2011 | Yalvac | |
| 2014/0140767 A1 | 5/2014 | Vitale et al. | |
| 2014/0193576 A1 | 7/2014 | Carlson | |
| 2014/0347731 A1 | 11/2014 | Tillotson et al. | |
| 2015/0140294 A1 | 5/2015 | Yakopson et al. | |

(Continued)

FOREIGN PATENT DOCUMENTS

| | | |
|---|---|---|
| GB | 1251377 | 10/1971 |
| JP | 2006249704 | 9/2006 |
| JP | 2005 090155 | 4/2007 |
| KR | 200426960 | 9/2006 |
| KR | 1020090076472 | 11/2010 |
| WO | 2014070229 | 5/2014 |

OTHER PUBLICATIONS

Technical Bulletin, JAD2000-0206. JEFFAMINE D-2000 Amine. Huntsman Corporation 2006.

(Continued)

*Primary Examiner* — Sanza L. McClendon
(74) *Attorney, Agent, or Firm* — Chrystal Tomblyn

(57) ABSTRACT

Thermoplastic compositions useful for sealing longitudinal joints of substrates, for example, roadways and pavement, are provided herein. Formulations including the composition and methods of using the thermoplastic composition to seal longitudinal joints are also disclosed.

19 Claims, 11 Drawing Sheets

(56) References Cited

U.S. PATENT DOCUMENTS

| | | | |
|---|---|---|---|
| 2015/0314485 A1 | 11/2015 | Puffer, Sr. et al. | |
| 2016/0024338 A1 | 1/2016 | Puffer, Sr. | |
| 2016/0060829 A1* | 3/2016 | Greer | E01C 23/166 404/94 |
| 2019/0055704 A1 | 2/2019 | Fasula et al. | |

OTHER PUBLICATIONS

National Transportation Product Evaluation program (NTPEP) Pavement marking Materials Data Usage Guide. [online]. AASHTO—The Voice of Transportation. [retrieved on Aug. 29, 2014]. Retrieved from Internet: http://www.ntpep.org/Documents/Technical_Committee/PMM/PMMUserGuide.pdf>. 4 pages.

California Test 423. "Methods for Testing Thermoplastic Traffic Line Material". Department of Transportation, Division of Engineering Services, Dec. 2006.

Florida Department of Transportation. [online]. Section 971. "Traffic Marking Materials" (REV Jan. 8, 2014)(FA Jan. 15, 2014) (Jul. 2014). [retrieved Apr. 24, 2014]. Retrieved from the Internet: ttp://ttp.dot.state.fl.us/LTD/CO/Specifications/SpecBook/2010Book/971.pdf>. 13 pages.

AASHTO Designation: M247-11. "Glass Beads Used in Pavement Markings". Standard specification. 2011.

AASHTO Designation: M249-09. White and Yellow Reflective Thermoplastic Striping Material (Solid Form). Standard Specification. 2010.

EP 15838379.4, "Extended European Search Report," dated Jan. 15, 2018 (9 pages).

PCT/2018/039451, International Search Report and Written Opinion, dated Oct. 18, 2018 (12 pages).

Pavement Technology, Inc., "Jointbond Ti pollution-reducing longitudinal joint stabilizer," 2018 (2 pages).

PCT/US2018/039451, International Preliminary Report on Patentability, dated Jan. 9, 2020, 9 pages.

PCT/US2020/030941, International Search Report and Written Opinion, dated Aug. 18, 2020, 13 pages.

\* cited by examiner

THERMOPLASTIC COMPOSITION FOR SEALING ROADWAY JOINTS

PRIORITY

This application claims priority to U.S. Provisional Application No. 62/525,035, filed on Jun. 26, 2017, which is incorporated herein by reference in its entirety.

FIELD

Described herein are thermoplastic compositions for applying to a substrate, for example pavement. In some aspects, the compositions described herein can be useful for sealing joints in pavement.

BACKGROUND

A longitudinal joint occurs in pavement where a first application of one material, for example, asphalt, is laid adjacent to a second application of a material, for example, an existing lane of asphalt or a second application of new asphalt. The joint is the interface between the materials applied in the two applications. Over time, a longitudinal crack can occur between the two surfaces, permitting the intrusion of water into the pavement, increasing roughness of the pavement, and thus limiting the life of the pavement.

A traverse joint occurs in an asphalt pavement when the paving operation is interrupted for an extended period of time or a portion of the roadway must be repaired after subsurface infrastructure repairs, such as cutting out a road section to repair a subterranean water line.

Conventional sealant materials for the joint of a roadway include applying a tack coat that usually consists of asphalt cement, an emulsion, or hot poured, rubberized asphalt sealer. These conventional sealants require substantial application time and result in significant delays in the use of the roadway. This delay is especially unwelcomed for longitudinal joints where a large portion of the roadway may be closed to normal traffic patterns until the seal of the joint has cured. An improved composition for sealing the joint of a roadway, and methods for applying the same, to provide a stronger seal with reduced downtime for application to the roadway is desired.

SUMMARY

This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings and each claim.

Described herein are thermoplastic compositions for sealing longitudinal joints of different pavement materials, for example asphalt. In some examples, the thermoplastic compositions may comprise a polyamide resin, a modified rosin ester, a modified gum rosin, a pigment, a wax, a plasticizer, and an inorganic filler. In some examples, the pigment may comprise carbon black. Optionally, the thermoplastic compositions may further comprise a copolymer, an antioxidant, and a light stabilizer. In some examples, the copolymer may comprise ethylene vinyl acetate and ethylene maleic anhydride. In some examples, the wax may comprise polyethylene wax. In some examples, the light stabilizer comprises a hindered amine, or hindered amine light stabilizer (HALS). In some examples, the plasticizer comprises one or more of castor oils, other naturally-occurring oils, di-isononyl phthalate, or other phthalates plasticizers. In some examples, the inorganic filler comprises at least one of calcium carbonate, silica, quartzite, marble grit, glass powder, glass cullet, and alumina. In some examples, the thermoplastic composition may further comprise an aggregate which may modify the texture of the seal to increase the roughness and provide a safer non-slip surface at the sealed joint. In some cases, the thermoplastic composition may further comprise an aggregate which may modify the appearance of the seal, specifically, the level of gloss of the seal.

In some examples, a thermoplastic composition for sealing roadway joints, comprising the thermoplastic composition described herein, may be applied to a roadway to form a barrier over a longitudinal joint that is substantially parallel to and located between adjacent lanes of a roadway. In some examples, the thermoplastic composition may protect the edge of the lanes of the roadway from deterioration. Deterioration can include cracking and raveling of the edge of the lane that permits intrusion of water, increases roughness, and limits the life of the roadway.

Also described are methods to make the thermoplastic compositions described herein. In some examples, the method of making a thermoplastic composition comprises adding at least one of a rosin-modified ester or a modified gum rosin to a vessel, adding a wax to the vessel, adding a polyamide resin to the vessel, adding a plasticizer to the vessel, adding a first charge of an inorganic filler to the vessel, adding a second charge of an inorganic filler to the vessel, and mixing the composition. Optionally, the method of making a thermoplastic composition may further comprise adding a copolymer to the vessel, adding an antioxidant to the vessel, and adding a light stabilizer to the vessel.

Also described are methods of using the thermoplastic composition described herein to seal roadway joints. In some examples, a method of sealing roadway joints comprises: (a) heating a thermoplastic composition, where the thermoplastic composition is mixed during the heating, where the mixing is performed by at least one of auger, agitation, or recirculation; and (b) applying the heated thermoplastic composition to a roadway joint, where the thermoplastic composition is applied by extruding, spraying, or other application to the roadway joint, where the roadway joint comprises a longitudinal joint that is substantially parallel to and located between adjacent lanes of a roadway.

The details of one or more embodiments are set forth in the description below. Other features, objects, and advantages will be apparent from the description and from the claims.

DETAILED DESCRIPTION

Figure 1:
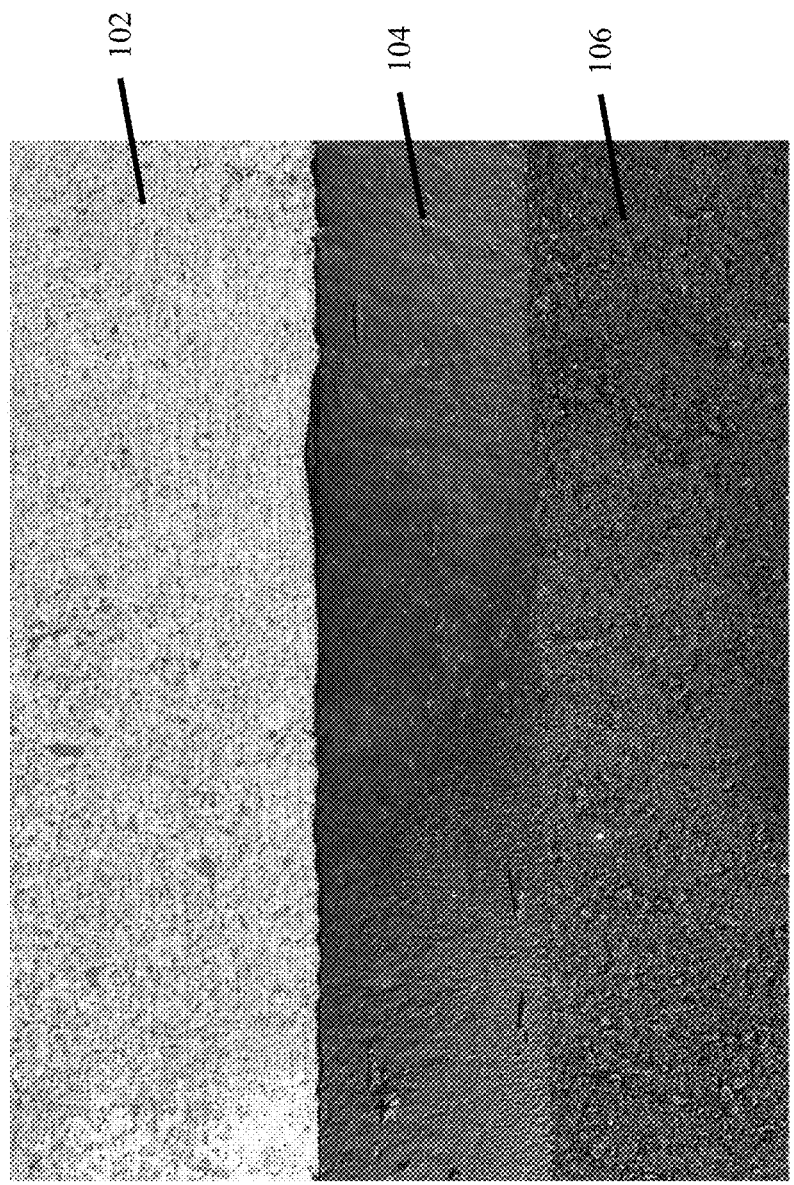
FIG. 1 shows a thermoplastic composition applied to a joint between a first surface of concrete and a second surface of asphalt.

Provided herein are thermoplastic compositions and methods that can be used to seal joints, especially longitudinal joints, in asphalt or concrete pavement and roadways. A longitudinal joint occurs, for example, in an asphalt pavement when a first application of asphalt is laid adjacent to a second application of asphalt, for example in some cases, a first lane and a second lane. Paving the width of a roadway in multiple lanes is generally required because paving the full width of the pavement in a single pass is usually impossible. Most single pavers are not wide enough to pave the width of a roadway, thus a seam or joint is created between paving lanes. The joint is the interface between the two asphalt applications, for example, between a first hot-mix asphalt (HMA) mat and a second hot-mix asphalt mat. In some cases, differences in the temperature and mat plasticity can cause an improper bonding of the first and second asphalt applications. For example, the bonding between a fresh application of HMA and an older asphalt lane can cause the longitudinal joint to possess a significantly lower density than the rest of the pavement. Over time, a longitudinal crack usually occurs between the asphalt mats, permitting the intrusion of water, increasing roughness, and potentially limiting the life of the pavement.

In some cases, the quality of the joint may be improved by creating hot joints, which are produced when the adjacent lanes are paved in echelon, i.e. when two pavers are spaced so that the first lane does not cool significantly before the second lane is laid. A hot joint can be essentially seamless and produces higher density joint region when compared to the other joints. However, creating hot joints requires the simultaneous paving of multiple lanes, which is generally not feasible as such paving requires closing of multiple lanes. Not only do work zones constrict traffic flow, but the capacity of asphalt production equipment is often limited to feeding no more than one paver at a time. With these limitations, cold joints are often created during paving projects.

A cold joint is produced when the first paved lane has cooled before the adjacent lane is placed to match it. The temperature gradient at the joint may cause a significant density gradient between the two mats on either side of the joint and result in very low strength in the joint or interface between the two mats. After a short period of time under traffic use, cold joints tend to ravel. In some cases, the raveling may be severe enough to completely erode the mix at the joint. Also, the low density at this joint can permit the seepage of water into the joint which could oxidize the bituminous material. Additional disadvantages with cold joints can include the inability to apply lane markings on the joint.

Conventional sealant materials for the longitudinal joint of a roadway include applying a tack coat that can consist of asphalt cement, emulsion, or hot poured, rubberized asphalt sealer. These conventional sealants require substantial application time and result in significant delays in the use of the roadway. In some cases, a conventional sealant may prevent use of the newly sealed roadway for 30 minutes or more. An improved seal of the longitudinal joint of a roadway that provides a stronger seal with reduced downtime to the roadway for application of the sealant is desirable. A sealant that may be applied without closure of the roadway is desirable. A sealant that allows for immediate application of lane markings is desirable.

According to the Federal Highway Administration, in 2013, there were 4.12 million miles of road in the United States, including Alaska and Hawaii. The core of the nation's highway system is the nearly 48,000 miles of Interstate Highways, which comprise just over 1 percent of highway mileage, but carry one-quarter of all highway traffic. The Interstates plus another 179,650 miles of major roads comprise the National Highway System, which carries most of the highway freight and traffic in the U.S. Of the over 4 million miles of road, about 2.68 million miles are paved. Thus, there is need for an improved composition to seal the longitudinal joints along the millions of miles of highway. This improved joint seal may prolong the life of the sealed roadway and delay costs of resurfacing beyond the expected 10-15 year timeframe.

The composition described herein includes a thermoplastic composition that may have superior properties to conventional sealant materials in the performance of the joint. In some aspects, the thermoplastic compositions described herein can provide limited disruption to traffic use of the roadway. In some aspects, the thermoplastic compositions described herein can minimize negative impacts on the environment and the health and safety of related personnel. The thermoplastic composition described herein comprises 100% solid materials that become a fluid when heated by equipment at the site of application. The thermoplastic composition may be applied in a variety of forms and can rapidly change from fluid phase to a durable solid phase so that it mechanically adheres to a surface when the temperature decreases below the melt temperature of the thermoplastic. Thermoplastics may be hydrocarbon-based, i.e., made from petroleum-derived resins, or alkyd-based, i.e., made from wood-derived resins, a renewable natural resource. Alkyd-based resins can be virtually impervious to oil and diesel fuels, which make them desirable for use in applications exposed to petroleum products. The thermoplastic compositions described herein can be alkyd-based.

In some examples, the composition can be a thermoplastic with fast application times that may minimize disruption to traffic due to construction zones. In some examples, the thermoplastic composition may be sufficiently tack-free in less than 5 minutes, for example, less than 4 minutes, 3 minutes, 2 minutes, or 1 minute, after application of the thermoplastic composition. In some aspects, this fast application time can allow use of the roadway after expiration of this short period of time. In some aspects, other roadway markings can be applied to thermoplastic compositions used to provide the joint seal. In some cases, roadway markings, for example yellow or white lane markings, can be applied to the thermoplastic compositions after the composition is applied, for example after 5 minutes, 4 minutes, 3 minutes, 2 minutes, or 1 minute. The immediacy of the application of roadway markings may provide a significant increase in highway safety and convenience by minimizing disruption of roadway closures.

Furthermore, the thermoplastic composition may provide improved visibility of roadway marking, especially on bridges and roadways with older asphalt that have a lighter color. In some cases, as asphalt ages, the density of the asphalt may change and the asphalt may become lighter in color. This lighter color, especially on bridge decks, reduces the contrast between the roadway and the safety markings on the roadway, for example, a light colored asphalt may have a washed out, white appearance and the road marking have a white color. During certain portions of the day, the two surfaces may not have a sufficient degree of contrast between the two so that a motorist can easily detect the lane marking. Such decrease in contrast can reduce highway safety.

Figure 5:
FIG. 5 shows a thermoplastic composition applied to a pavement surface.

In contrast, FIG. 5 shows an example of the thermoplastic composition applied to a roadway. First, the contrast of the thermoplastic composition between aged asphalt is apparent in FIG. 5. The dark color of the thermoplastic composition contrasts with the existing asphalt. Second, the dark color of the thermoplastic composition provides a dark surface and background upon which a marking can be applied, for example a white or yellow lane marking. In some cases, the thermoplastic composition can be applied in a width that is greater than a lane marking. The thermoplastic composition, which may be applied by conventional application techniques, such as extrusion or high pressure spraying, is black in color and may provide a greater contrast and thus improved visibility between the sealed roadway and the safety markings (yellow or white), thereby potentially increasing highway safety. The increased visibility may be provided not only in the lane dividing markers, but also the lane edge markers.

Also described herein are methods of making the thermoplastic composition and methods of using the thermoplastic composition described herein to seal longitudinal joints in pavement.

Compositions and Properties of the Compositions

In some examples, a thermoplastic composition comprises a polyamide resin, a copolymer, at least one of a rosin-modified ester or a modified gum rosin, a pigment, a wax, an antioxidant, a light stabilizer, a plasticizer, and an inorganic filler. The composition may further comprise at least one of a co-polymer, an antioxidant, or a light stabilizer.

In some examples, a thermoplastic composition comprises a polyamide resin, a copolymer, at least one of a rosin-modified ester or a modified gum rosin, a pigment, a wax, an antioxidant, a light stabilizer, a plasticizer, and an inorganic filler. The pigment may provide color and opacity to the composition. The inorganic filler may add bulk to the composition and provide a composition that has greater elongation properties. The plasticizer and resins may provide toughness, flexibility, and bond strength to the composition, while binding together all the components of thermoplastic composition.

In some embodiments, the thermoplastic composition described herein comprises a polyamide resin in an amount of from about 2 to about 30% (e.g., from 2 to 20%, from 5 to 25%, or from 10 to 20%). In some examples, the thermoplastic composition may include about 2%, 3%, 4%, 5%, 6%, 7%, 8%, 9%, 10%, 12%, 14%, 16%, 18%, 20%, 22%, 24%, 26%, 28%, or 30% polyamide resin. All are expressed in wt. %. In some embodiments, the polyamide resin comprises at least one of polyolefin elastomers, polypropylene copolymers, styrene-butadiene-styrene (SBS) polymers, and styrene-isoprene-styrene (SIS) polymers.

In some embodiments, the thermoplastic composition described herein comprises a copolymer in an amount up to 10% (e.g., from 0 to 5%, from 0.2 to 2.5%, from 0.8 to 2.5%, or from 1 to 6%). In some examples, the thermoplastic composition may include about 0.1%, 0.2%, 0.4%, 0.6%, 0.8%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5% or 10% copolymer. All are expressed in wt. %. In certain embodiments, the composition may be substantially free of a copolymer. In some embodiments, the copolymer comprises at least one of ethylene vinyl acetate and ethylene maleic anhydride.

In some embodiments, the thermoplastic composition described herein comprises a rosin-modified ester in an amount up to about 40 wt. % (e.g., from 5 to 15%, from 3 to 18%, or 11 to 25%). In some examples, the thermoplastic composition may include about 1%, 2%, 3%, 4% 5%, 6%, 7%, 8%, 9%, 10%, 12%, 14%, 16%, 18%, 20%, 22%, 24%, 26%, 28%, 30%, 32%, 34%, 36%, 38% or 40% rosin-modified ester. All are expressed in wt. %. In certain embodiments, the composition may be substantially free of rosin-modified esters. In some embodiments, modified rosin ester comprises tall oil esters, maleic rosin ester, pentaerythritol rosin ester, glycerol rosin ester, disproportionated rosin ester, hydrogenated rosin, or polymerized rosin.

In some embodiments, the thermoplastic composition described herein comprises a modified gum rosin in an amount up to about 40 wt. % (e.g., from 5 to 25%, from 2 to 15%, from 3 to 18%, or from 11 to 25%). In some examples, the thermoplastic composition may include about 1%, 2%, 3%, 4% 5%, 6%, 7%, 8%, 9%, 10%, 12%, 14%, 16%, 18%, 20%, 22%, 24%, 26%, 28%, 30%, 32%, 34%, 36%, 38% or 40% modified gum rosin. All are expressed in wt. %. In certain embodiments, the composition may be substantially free of modified gum rosins. In some embodiments, modified gum rosin comprises glyceryl hydrogenated rosin, rosin modified phenolic resin, pentaerythrityl rosin, glyceryl rosin, disproportionated rosin, polymerized rosin or hydrogenated rosin.

In some embodiments, the thermoplastic composition described herein comprises pigment in an amount of from about 0.1 to about 10 wt. % (e.g., from 0.2 to 1.2%, 0.5 to 2%, or 2 to 5%). In some examples, the thermoplastic composition may include about 0.1%, 0.2%, 0.3%, 0.4%, 0.5%, 0.6%, 0.7%, 0.8%, 0.9%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, or 10% pigment. All are expressed in wt. %. In some embodiments, the pigment may comprise carbon black.

In some embodiments, the thermoplastic composition described herein comprises wax in an amount of up to about 20 wt. % (e.g., from 0.5 to 5%, from 1 to 4%, from 1 to 8%, or 5 to 10%). In some examples, the thermoplastic composition may include about 0.5%, 1%, 2%, 3%, 4%, 5%, 6%, 7%, 8%, 9%, 10%, 12%, 14%, 16%, 18%, or 20% wax. All are expressed in wt. %. In some embodiments, the wax may comprise polyethylene wax, functionalized PE wax, polypropylene wax and similar formulations.

In some embodiments, the thermoplastic composition described herein comprises an antioxidant in an amount of up to about 3 wt. % (e.g., from 0.1 to 0.4%, from 0.8 to 2%, or 0 to 3%). In some examples, the thermoplastic composition may include about 0.05%, 0.1%, 0.15%, 0.2%, 0.4%, 0.6%, 0.8%, 1%, 1.2%, 1.4%, 1.6%, 1.8%, 2%, 2.2%, 2.4%, 2.5%, 2.6%, 2.7%, 2.8%, 2.9%, or 3% antioxidant. All are expressed in wt. %. In certain embodiments, the composition may be substantially free of an antioxidant.

In some embodiments, the thermoplastic composition described herein comprises a light stabilizer in an amount of up to about 3.5 wt. % (e.g., from 0.2 to 1.6%, from 0.6 to 2.5%, or 0 to 3%). In some examples, the thermoplastic composition may include about 0.05%, 0.1%, 0.2%, 0.4%, 0.6%, 0.8%, 1%, 1.2%, 1.4%, 1.6%, 1.8%, 2%, 2.2%, 2.4%, 2.6%, 2.8%, 3%, 3.2%, 3.4%, or 3.5% light stabilizer. All are expressed in wt. %. In certain embodiments, the composition may be substantially free of a light stabilizer. In some embodiments, the light stabilizer comprises a hindered amine, or hindered amine light stabilizer (HALS).

In some embodiments, the thermoplastic composition described herein comprises a plasticizer in an amount of up to about 10 wt. % (e.g., from 1 to 4%, from 1 to 5%, or from 3 to 7%). In some examples, the thermoplastic composition may include about 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, or 10% plasticizer. All are expressed in wt. %. In some embodiments, the plasticizer comprises one or more of castor oils, other naturally-occurring oils, di-isononyl phthalate, or other phthalates plasticizers.

In some embodiments, the thermoplastic composition described herein comprises an inorganic filler in an amount of from about 5 to about 90 wt. % (e.g., from 10 to 50%, from 20 to 50%, or from 40 to 60%). In some examples, the thermoplastic composition may include about 5%, 10%, 20%, 25%, 30%, 35%, 40%, 45%, 50%, 55%, 60%, 65%, 70%, 75%, 80%, 85%, or 90% inorganic filler. All are expressed in wt. %. In some embodiments, the inorganic filler comprises one or more of calcium carbonate, silica, quartzite, marble grit, glass powder, glass cullet, and alumina.

In some embodiments, the thermoplastic composition described herein comprises 3 to 10 wt. % polyamide resin, 0.7 to 3 wt. % copolymer, 5 to 20 wt. % rosin-modified ester, 0.2 to 1.5 wt. % pigment, up to 5 wt. % wax, up to 0.5 wt. % antioxidant, up to 0.7 wt. % light stabilizer, up to 4 wt. % plasticizer, and 20 to 80 wt. % inorganic filler. In some embodiments, the thermoplastic composition comprises 100% solid materials.

In some embodiments, the thermoplastic composition described herein comprises 2 to 20 wt. % polyamide resin, 0 to 5 wt. % copolymer, 3 to 18 wt. % rosin-modified ester, 0 to 10 wt. % modified gum rosin, 0.5 to 4 wt. % ethylene vinyl acetate copolymer, 0.5 to 2 wt. % pigment, 0.5 to 5 wt. % wax, up to 3 wt. % antioxidant, up to 3 wt. % light stabilizer, 1 to 5 wt. % plasticizer, 20 to 50 wt. % of a first inorganic filler, and 20 to 50% of a second inorganic filler. In some cases, the first inorganic filler can comprise sand. In some cases, the second inorganic filler can comprise calcium carbonate.

In some embodiments, the thermoplastic composition described herein comprises 2 to 20 wt. % polyamide resin, 0 to 5 wt. % copolymer, 3 to 18 wt. % rosin-modified ester, 0 to 10 wt. % modified gum rosin, 0.5 to 4 wt. % ethylene vinyl acetate copolymer, 0.5 to 2 wt. % pigment, 0.5 to 5 wt. % wax, up to 3 wt. % antioxidant, up to 3 wt. % light stabilizer, 1 to 5 wt. % plasticizer, 20 to 80 wt. % of an inorganic filler. In some cases, the inorganic filler can comprise sand or calcium carbonate.

In some embodiments, the thermoplastic composition described herein comprises 2 to 20 wt. % polyamide resin, 0 to 5 wt. % copolymer, 3 to 18 wt. % rosin-modified ester, 2 to 15 wt. % modified gum rosin, 0.5 to 4 wt. % ethylene vinyl acetate copolymer, 0.5 to 2 wt. % pigment, 0.5 to 5 wt. % wax, up to 3 wt. % antioxidant, up to 3 wt. % light stabilizer, 1 to 5 wt. % plasticizer, 20 to 50 wt. % of a first inorganic filler, and 20 to 50% of a second inorganic filler. In some cases, the first inorganic filler can comprise sand. In some cases, the second inorganic filler can comprise calcium carbonate.

In some embodiments, the thermoplastic composition described herein comprises 2 to 20 wt. % polyamide resin, 0 to 5 wt. % copolymer, 3 to 18 wt. % rosin-modified ester, 2 to 15 wt. % modified gum rosin, 0.5 to 4 wt. % ethylene vinyl acetate copolymer, 0.5 to 2 wt. % pigment, 0.5 to 5 wt. % wax, up to 3 wt. % antioxidant, up to 3 wt. % light stabilizer, 1 to 5 wt. % plasticizer, 20 to 80 wt. % of an inorganic filler. In some cases, the inorganic filler can comprise sand or calcium carbonate.

In some embodiments, the thermoplastic composition may have a viscosity of 1,000 to 50,000 cP, where the viscosity is measured at 425° F. with a Brookfield Viscometer at 6 rpm, #4 or #64 spindle. In some embodiments, the thermoplastic composition may have a viscosity of 1,000 to 40,000 cP, where the viscosity is measured at 425° F. with a Brookfield Viscometer at 12 rpm, #4 or #64 spindle. In some examples, the thermoplastic composition may have a viscosity of 1,000 to 30,000 cP where the viscosity is measured at 425° F. with a Brookfield Viscometer at 30 rpm, #4 or #64 spindle. In some examples, the thermoplastic composition may have a viscosity of 1,000 to 10,000 cP where the viscosity is measured at 425° F. with a Brookfield Viscometer at 60 rpm, #4 or #64 spindle. In some examples, the thermoplastic composition may have a viscosity of 2,500 to 8,000 cP, 4,000 to 12,000 cP, 5,000 to 16,000 cP, or 7,000 to 22,000 cP where the viscosity is measured at 425° F. with a Brookfield Viscometer at 6 rpm, #4 or #64 spindle.

In some embodiments, the thermoplastic composition may have a specific gravity of less than 2.15. In some examples, the thermoplastic composition may have a specific gravity of 1.6 to 2.1. In some embodiments, the thermoplastic composition may have a softening point of 200 to 260° F. (e.g., 200 to 250° F., 212 to 260° F.). In some embodiments, the flash point of the thermoplastic composition may be at least 500° F., as tested by ASTM D92 (2018).

The resilience of the thermoplastic composition can be important for roadway applications that will be subjected to forces from daily vehicular traffic and varying weather conditions as well as snow removal equipment in climates receiving severe winter weather.

In some examples, the thermoplastic composition may have desirable low temperatures stress resistance and may not crack when exposed to temperatures of about 15° F. for about 3 days, as tested according to AASHTO T 250 (2005).

In some examples, the thermoplastic composition may have a minimum impact resistance of 160 psi, measured at 23° C. In some examples, the thermoplastic composition may have a minimum impact resistance of 140 psi, measured at 0° C.

In some examples, the thermoplastic composition may have a hardness of 5 to 75 units, (e.g., 15 to 40 units, 35 to 70 units), measured with 1 kg at 115° F. and shore A durometer.

In some examples, the thermoplastic composition may have a maximum weight loss of 350 mg during abrasion resistance test ASTM D4060, using a Tabor Abraser.

In some examples, after heating the thermoplastic composition for approximately four hours at about 425° F., the bond strength to Portland Cement Concrete may be at least 200 psi, as tested by ASTM D4796 or ASTM C321 (2018).

In some examples, the heated thermoplastic may have a percent elongation of at least 20%, as tested by ASTM D638 (2018). In some examples, the thermoplastic may be tested for flexibility using a Mandrel Bend Test, as tested by ASTM D522-93A (2008). The composition may pass Mandrel Bend Testing at ambient and reduced temperatures, e.g., 5° C.

As described herein, the composition may not exude dangerous fumes upon heating to application temperature. The substantial lack of fumes is important to the health and safety of workers in the vicinity of the hot thermoplastic composition. In some embodiments, improved health and safety can be aided by the thermoplastic composition comprising 100% solids. For example, conventional materials often rely on petroleum-based products that may emit potentially harmful fumes at application temperatures and expose workers in the vicinity of the application of the conventional sealant produce, increasing the workers risk of adverse health effects. In some embodiments, the composition described herein provides a reduced level of exposure to workers in the vicinity of the application of the thermoplastic composition sealant, thus improving worker health and safety.

Methods of Making the Composition

In some examples, a method of making a thermoplastic composition described herein comprises adding a wax to the vessel, adding a polyamide resin to the vessel, adding a plasticizer to the vessel, adding a first charge of an inorganic filler to the vessel, adding a second charge of an inorganic filler to the vessel, adding at least one of a rosin-modified ester or a modified gum rosin to a vessel, and mixing the thermoplastic composition. Optionally, the method may further comprise adding a copolymer to the vessel. The method may further comprise adding an antioxidant to the vessel. In some cases, the method may further comprise adding a light stabilizer to the vessel. Optionally, the composition may be blended at ambient temperatures and packaged for future use. In some examples, the method may further comprise adding a pigment to the vessel.

Optionally, the method may further comprise adding a second copolymer to the vessel after the polyamide resin addition. In some embodiments, the first charge of inorganic filler may be at least 50% of a total amount of inorganic filler to be charged. In some examples, the method may further comprise mixing the thermoplastic composition until the thermoplastic composition is an essentially homogeneous mixture or essentially uniform dispersion. The mixing may be performed by at least one of auger, agitation, or recirculation. In some embodiments, the method may further comprise heating the vessel to about 340-450° F.

Methods of Using the Composition

The thermoplastic compositions described herein are useful for sealing roadway joints, for example, longitudinal joints. In some examples, the thermoplastic compositions described herein may be used to cover and seal the longitudinal joints of a pavement to prevent water ingress to the longitudinal seam of the pavement. As used herein, the terms joint and seam are interchangeable. As used herein the terms highway, roadway, and pavement are interchangeable.

In some cases, a method of sealing roadway joints may comprise: (a) heating a thermoplastic composition, where the thermoplastic composition is mixed during the heating, where the mixing is performed by at least one of auger, agitation, or recirculation and (b) applying the heated thermoplastic composition to a roadway joint, where the thermoplastic composition is applied by extrusion, spraying, or other application means to the roadway joint. In some cases, the roadway joint comprises a longitudinal joint that is substantially parallel to and located between adjacent lanes of a roadway. In some examples, the method can additionally include cooling the applied thermoplastic composition to form a solid seam on the hot-mix asphalt roadway joint.

In some embodiments, the thermoplastic composition is heated to about 340 to 450° F. (e.g., from about 350 to 400° F.; from 400 to 450° F.; from 375 to 425° F.). The temperature range for heating the thermoplastic composition may be adjusted based on the surface temperature of the roadway and the ambient air temperature to ensure proper adhesion of the thermoplastic composition. The application temperature may be lowered for hot surfaces and may be increased for cooler surfaces. In some cases, both the surface temperature of the roadway and the ambient air temperature, accounting for wind chill, should be at least 50° F. prior to application of the thermoplastic composition.

Figure 4:
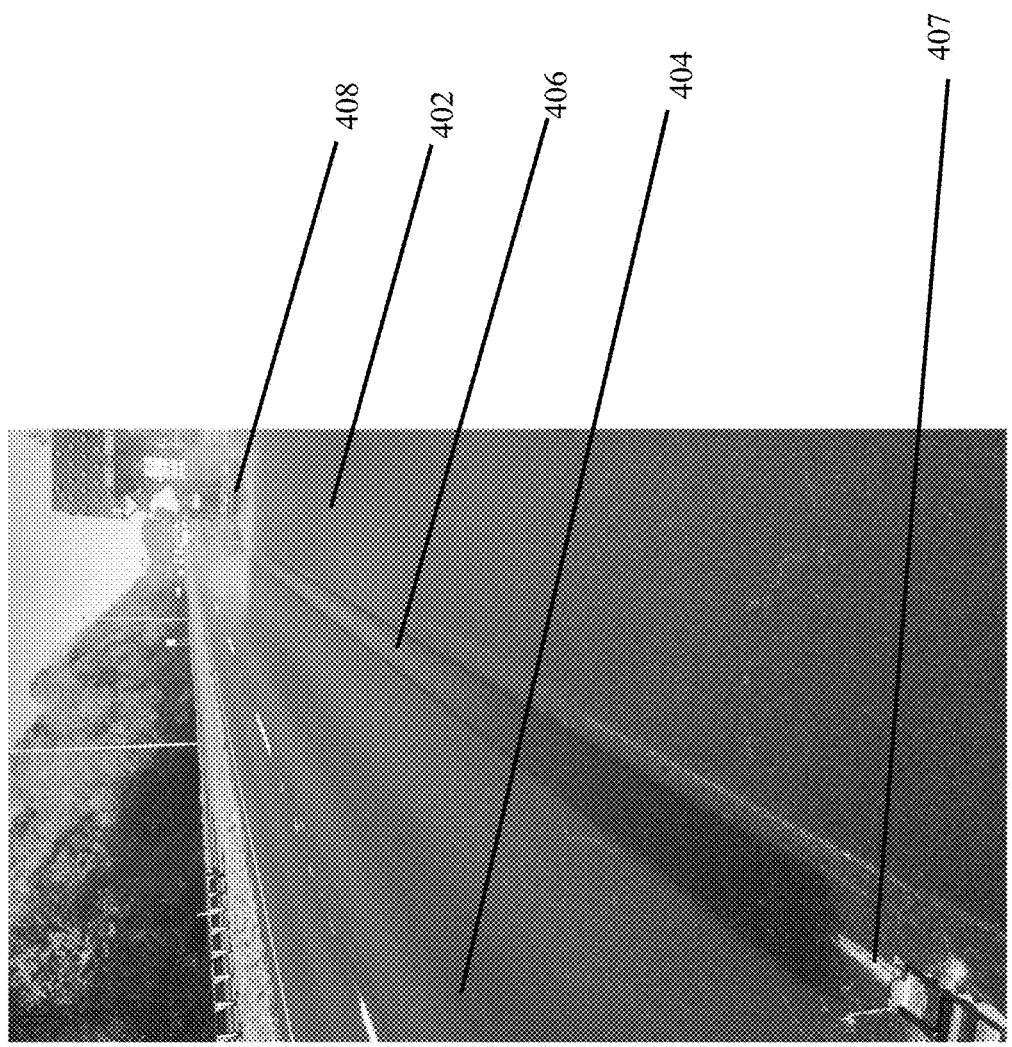
FIG. 4 shows a thermoplastic composition applied to a pavement surface.

In some examples, the thermoplastic composition may be applied be standard thermoplastic extrusion equipment. The extrusion die may be configured to extrude the thermoplastic composition at the desired width onto directly onto the roadway at the site of the joint via a mobile extrusion unit. FIG. 4 shows the application of the thermoplastic composition along a highway. In some cases, the thermoplastic composition may be extruded at about 8 miles per hour and may allow the roadway to remain open during application. As shown in FIG. 4, the lane adjacent to the newly applied joint seal, 404, remains open to traffic. The extruder 408 may be integrated with the application vehicle.

In some embodiments, the thermoplastic composition may be extruded as wide as 12 inches. For example, the thermoplastic may be extruded at 6 inches, 8 inches, or 10 inches wide. The wider width of the thermoplastic composition joint seal can allow for lane markings to be applied directly to portion of the surface having the joint seal. In some examples, the lane markings can be narrower in width than the joint seal. In some examples, the joint seal can provide an area that provides increased contrast and improved visibility of the yellow or white lane markings against the darker joint seal. The contrast may be more marked for a roadway that has become lighter as a result of aging.

In some examples, the 100% solids formulation of the thermoplastic composition may allow for ease of extrusion. In some embodiments, the thickness of the extruded thermoplastic composition may be about 15 to 150 mils (0.015 to 0.15 inches). For example, the thickness of the extruded application may be about 15 mils, 20 mils, 25 mils, 30 mils, 35 mils, 40 mils, 45 mils, 50 mils, 55 mils, 60 mils, 65 mils, 70 mils, 75 mils, 80 mils, 85 mils, 90 mils, 95 mils, 100 mils, 105 mils, 110 mils, 115 mils, 120 mils, or 125 mils. The durability of the joint seal may be related to the thickness of the thermoplastic composition applied. For example, a 120 mil seal may be expected to experience increased durability as compared to a 60 mil seal.

In some cases, the pavement surface can be prepared prior to application of the thermoplastic composition. In some embodiments, the surface may cleaned of dust or debris. The surface can also be substantially dry prior to application of the thermoplastic composition. In some cases, the moisture content of the surface may also be evaluated prior to application, especially if the dew point is close to the ambient temperature. In some cases, an adhesion test may be performed on a test area that has completely cooled after application to ensure proper binding of the thermoplastic composition to the roadway.

In some examples, joints along aged roadways may be sealed with the thermal composition described herein. The surface may be primed or mechanically abraded prior to sealing. In some examples, joints along new roadways may be sealed with the thermal composition described herein. Application to a new concrete roadway may benefit from a period of cure time and/or abrasion to improve adhesion. In some examples, application to a new HMA roadway may be performed once the new HMA mat has cooled to below 100° F.; however, the application may benefit from an aging period of the HMA mat to allow the HMA to cure and for additives of the HMA such as oils and roller aides time to be tracked off the new surface.

In some examples, an aggregate may be applied to the extruded thermoplastic composition while the composition is cooling. In some embodiments, the application of the aggregate may be performed by dropping the aggregate onto the hot thermoplastic composition. In some cases, the aggregate may comprise different compositions, for example, those with low free silica. The aggregate may modify the texture of the seal to increase the roughness and provide a safer non-slip surface at the sealed joint. The aggregate may also reduce the time that traffic flow is limited on the roadway. Additionally, the aggregate may modify the visual appearance or reflective properties of the composition, making the composition appear less glossy to an observer.

The surface and ambient air temperatures may vary the time for the thermoplastic composition to cool. In some examples, the thermoplastic composition may be sufficiently tack-free in approximately 2 minutes, for example when the surface temperature is approximately 50° F. In other examples, the thermoplastic composition may be sufficiently tack-free in approximately 10 minutes, for example when the surface temperature is approximately 130° F.

In some examples, a fan or other means of cooling the composition may be employed to reduce the time for the composition to cool. The reduced cooling time may improve traffic flow in the construction area. The reduced cooling time may further allow for quicker application of lane marking to the sealed joints. The rapid application speed, including extrusion and cooling of the thermoplastic composition, is a dramatic improvement over conventional methods of sealing the joints.

EXAMPLE 1

In one example, the thermoplastic composition can include the formulation shown in Table 1.

TABLE 1

| Component | Trade Name | Amount (wt %) |
|---|---|---|
| pigment | Carbon Black | 0.5-2 |
| maleated glycerol ester resin | Alkyd Resin Westrez 5230 | 3-18 |
| polyethylene wax | CS-42F Wax | 0.5-5 |
| ethylene vinyl acetate copolymer | EVA UL7510 | 2-15 |
| polyamide | PAF2526c-01 | 2-20 |
| copolymer | AC-575P Ethylene MA | 0-5 |
| antioxidant | Irganox 1010 | 0-3 |
| hindered amine light stabilizer | Unitechem HALS 622 | 0-3 |
| plasticizer | Castor Oil #1 Raw | 1-5 |
| filler 1 | Hubercarb G260A | 20-50 |
| filler 2 | sand | 20-50 |

The composition was applied to an asphalt surface at 380-425° F.

EXAMPLE 2

FIG. 1 shows a thermoplastic composition 104 applied along a joint at an interface between a first surface 102 and a second surface 106. Thermoplastic composition 104 is described in Example 1. The first surface 102 is a concrete surface and the second surface 106 is asphalt. The joint between the first surface 102 and second surface 106 is covered and no cracks are apparent in the thermoplastic composition 104 that seals the joint of the first surface 102 and the second surface 106.

Figure 2:
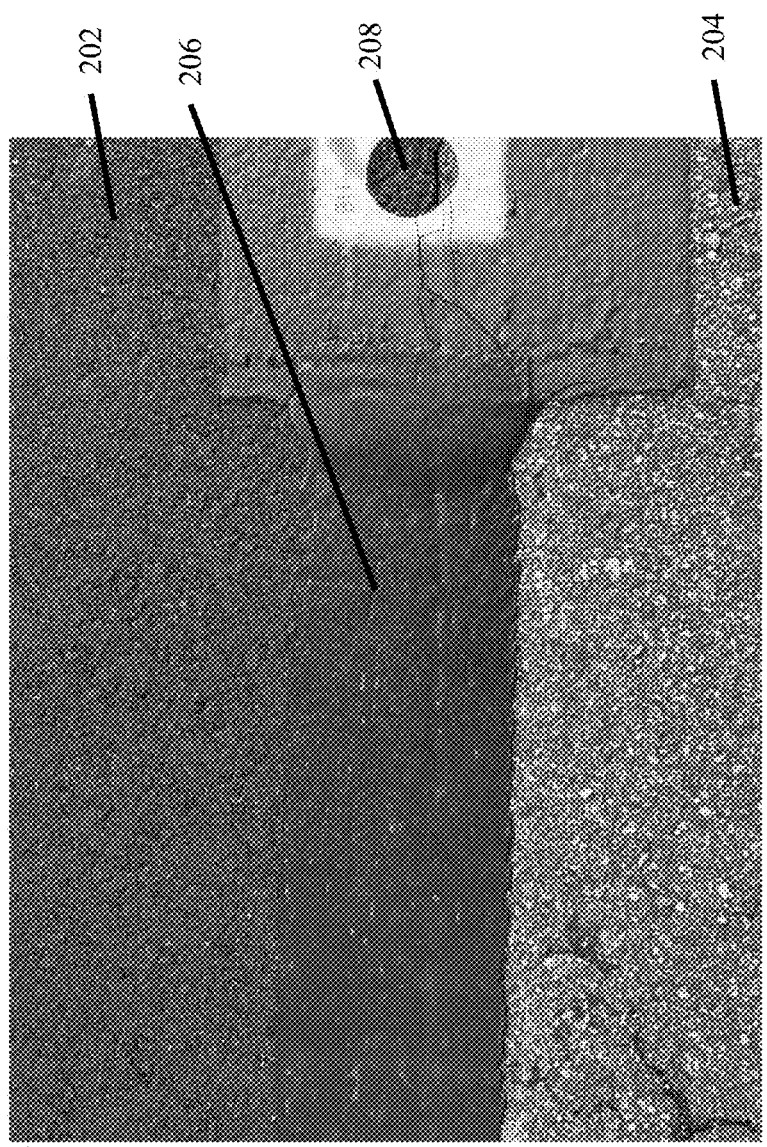
FIG. 2 shows a thermoplastic composition applied to a joint between a first asphalt and a second asphalt interface.

FIG. 2 shows a thermoplastic composition 206 applied along a joint at an interface between a first asphalt 202 and a second asphalt 204. Thermoplastic composition 206 is described in Example 1. The area of the joint covered with the thermoplastic composition 206 shows no cracks. However, the unsealed portion 208 of the joint shows the exposed joint and crack at the interface of the HMA mats.

Figure 3:
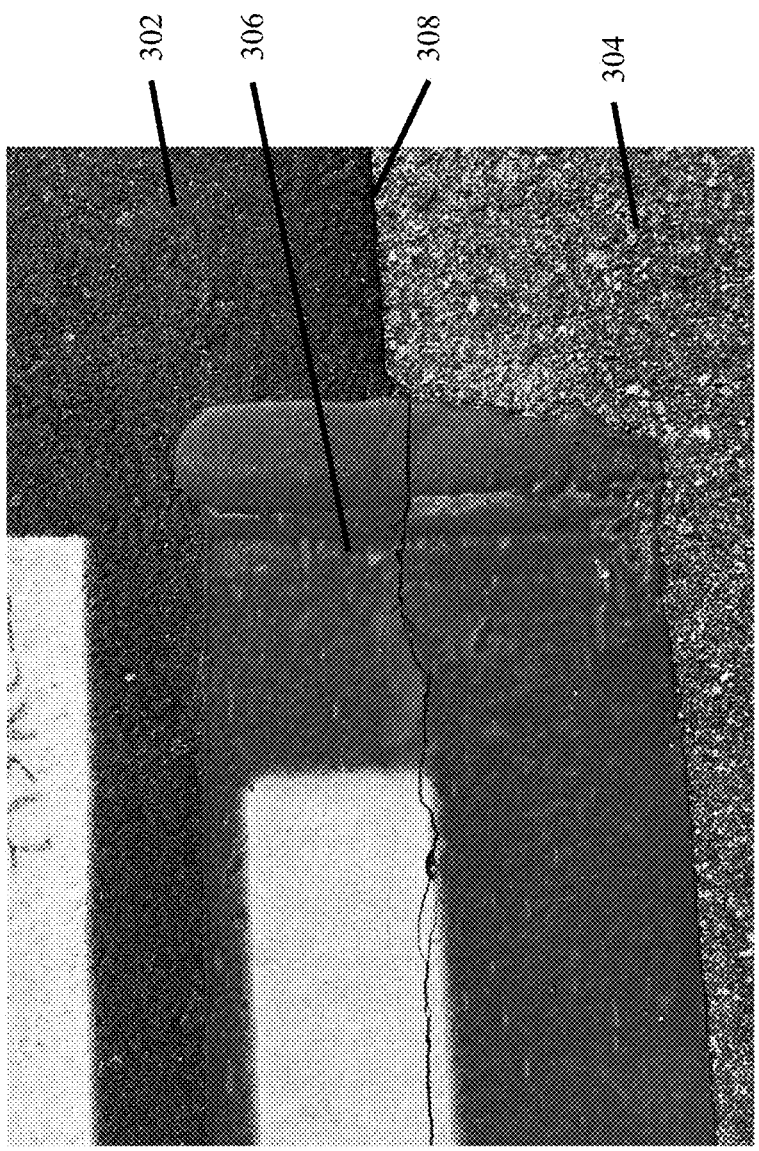
FIG. 3 is a comparative example that shows cracking along a joint between a first asphalt and a second asphalt.

On the other hand, FIG. 3 shows a comparative example of a joint sealed with thermoplastic composition 306 along an interface of a first asphalt 302 and a second asphalt 304. Thermoplastic composition 306 differs from the thermoplastic compositions described herein. The unsealed joint 308 shows the exposed joint and the interface of the first asphalt 302 and the second asphalt 304. The area of the joint covered with the thermoplastic composition 306 shows a crack along the longitudinal joint. Thermoplastic composition 306 includes glass beads and a lower level of inorganic filler as compared to the thermoplastic compositions 104, 206 used in FIGS. 1 and 2.

In FIG. 3, the interface between the two different asphalt mats overpowered the thermoplastic composition 306 resulting in a failed joint seal. Not to be bound by any theory, an increased amount of glass beads and lower amount of inorganic filler may reduce elongation and flexibility within the thermoplastic composition 306, which may have contributed to the failure of the composition at the site of the joint in FIG. 3. Improved flexibility and elongation may be achieved by increasing the amount of inorganic filler and reducing or eliminating glass beads within the thermoplastic compositions, for example, as shown in FIGS. 1 and 2. The increased flexibility of the composition adapts to the expansion and contraction of the joint and maintains the seal over the joint.

EXAMPLE 3

The thermoplastic compositions described herein were applied to a highway. The application using the vehicle-mounted extruder 408 is shown in FIGS. 4 and 5. The joint seal 408 rapidly cools and permits traffic to flow normally in the adjacent lane 404.

EXAMPLE 4

Figure 6:
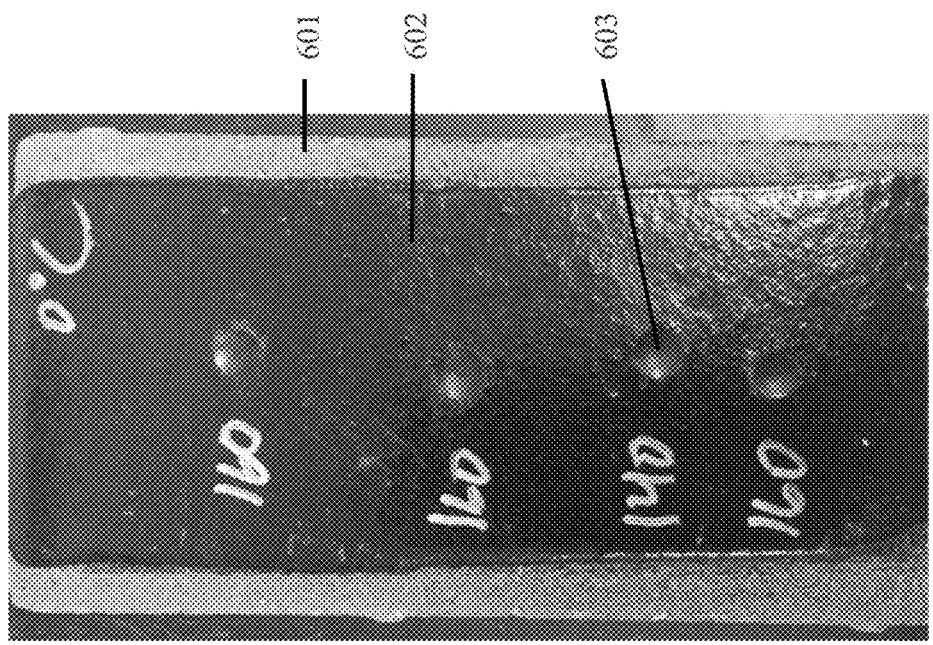
FIG. 6 shows impact resistance testing of a thermoplastic composition applied to a substrate.
Figure 7:
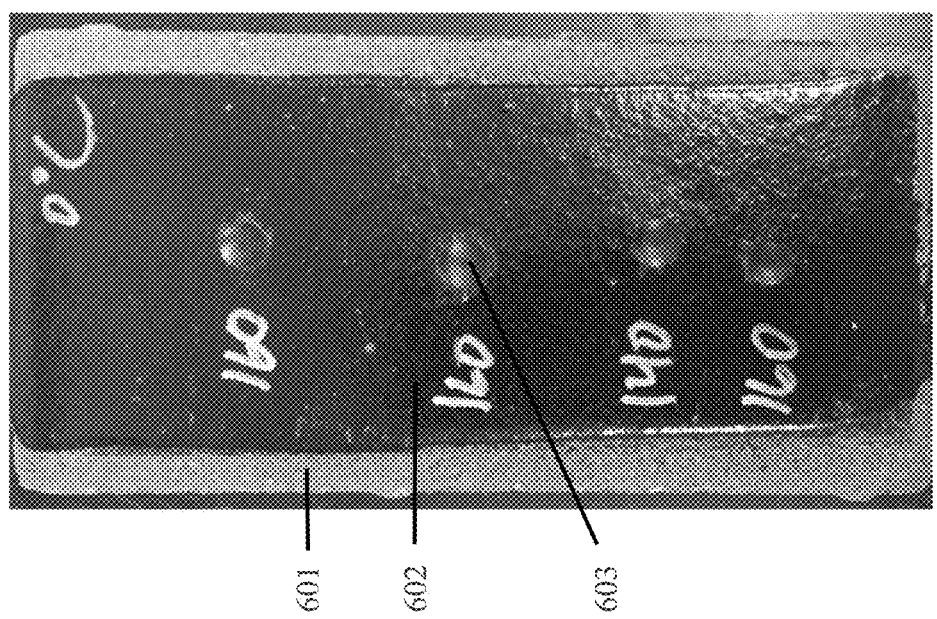
FIG. 7 shows impact resistance testing of a thermoplastic composition applied to a substrate.

The thermoplastic compositions described herein were tested for impact resistance. The composition 602 was applied to a substrate 601 and tested for impact resistance according to ASTM D5420-98a. The composition 602 is shown in Example 1. FIGS. 6 and 7 show the results of impact resistance testing conducted at 0° C. The composition 602 absorbed the energy from the impact without cracking as shown in FIG. 6. The composition 602 has a deformation 603 at each site of the impact, but no other damage or failure to the composition 602 or substrate 601 is visible. FIG. 7 shows the results of a repeated impact test at 0° C. Again, the composition 602 absorbed the energy from the impact without cracking. In FIG. 7, the composition 602 has a deformation 603 at each site of the impact, but no other damage or failure to the composition 602 or substrate 601 is visible upon repeated impact.

Figure 8:
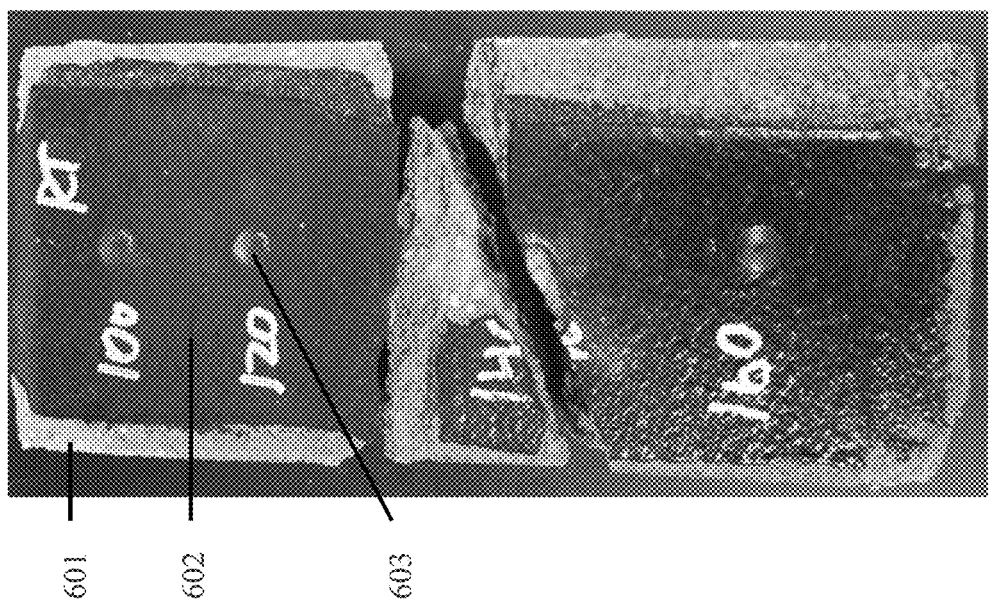
FIG. 8 shows impact resistance testing of a thermoplastic composition applied to a substrate.
Figures 9A, 9B:
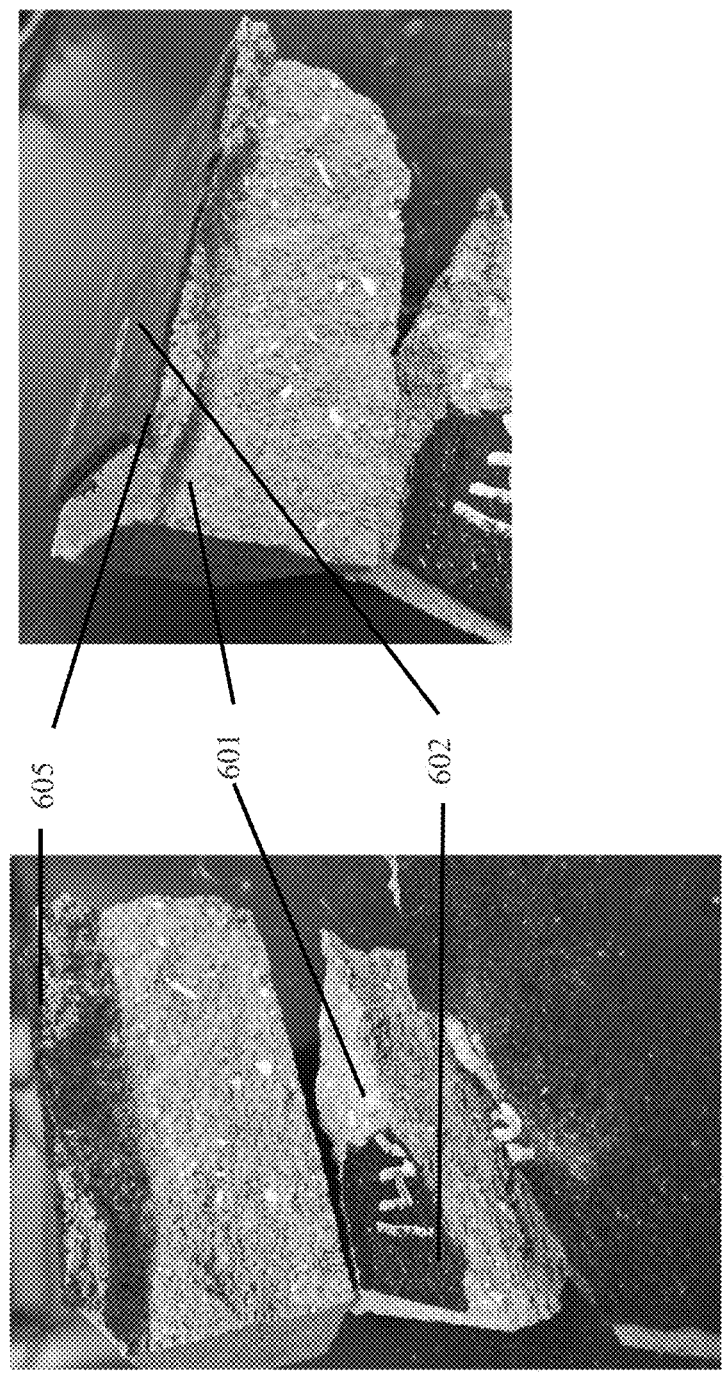
FIGS. 9A and 9B show a cross-section of impact resistance testing of a thermoplastic composition applied to a substrate.

FIGS. 8, 9A, and 9B show the results of impact resistance testing conducted at ambient conditions ("RT" referring to room temperature). In FIG. 8, the composition 602 has a deformation 603 at each site of the impact, with no cracking in the composition 602 at the site of impact. The substrate 601 fractured during the test. FIGS. 9A and 9B show a cross-section of the substrate with the seal composition applied. While the substrate 601 fractured during the test, the composition 602 did not delaminate from the substrate as shown at the interface 605 of the composition 602 and substrate 601.

EXAMPLE 5

Mandrel bend testing was performed on thermoplastic compositions described herein according ASTM D522-93A (2008). Coatings attached to substrates are elongated when the substrates are dimensionally unstable, or when the coatings are abused in service. Mandrel bend testing can be useful in rating attached coatings for their ability to resist cracking when elongated.

Two compositions were evaluated for resistance to cracking using cylinder having a diameter ranging from 0.125 inch to one inch. Sample size was 6-inches×1-inch. Sample 1 had the formulation as set forth in Example 1. The formulation of Sample 2 was similar to Sample 1, but was modified to include 2-15 wt. % modified gum rosin. To evaluate resistance to cracking in different weather applications, mandrel bend testing was conducted at both 24° C. and 5° C. The test results for Sample 1 and Sample 2 at each cylinder diameter for each temperature are provided in Table 2.

TABLE 2

| Cylinder diameter (inch) | Sample 1 | Sample 2 | Sample 1 | Sample 2 |
|---|---|---|---|---|
| | 24° C. | | 5° C. | |
| 1 | PASS | PASS | FAIL | PASS |
| 0.75 | PASS | PASS | FAIL | PASS |
| 0.625 | PASS | PASS | FAIL | PASS |
| 0.5 | FAIL | PASS | FAIL | FAIL |
| 0.375 | FAIL | PASS | FAIL | FAIL |
| 0.25 | FAIL | PASS | FAIL | FAIL |
| 0.125 | FAIL | FAIL | FAIL | FAIL |

EXAMPLE 6

Figure 10:
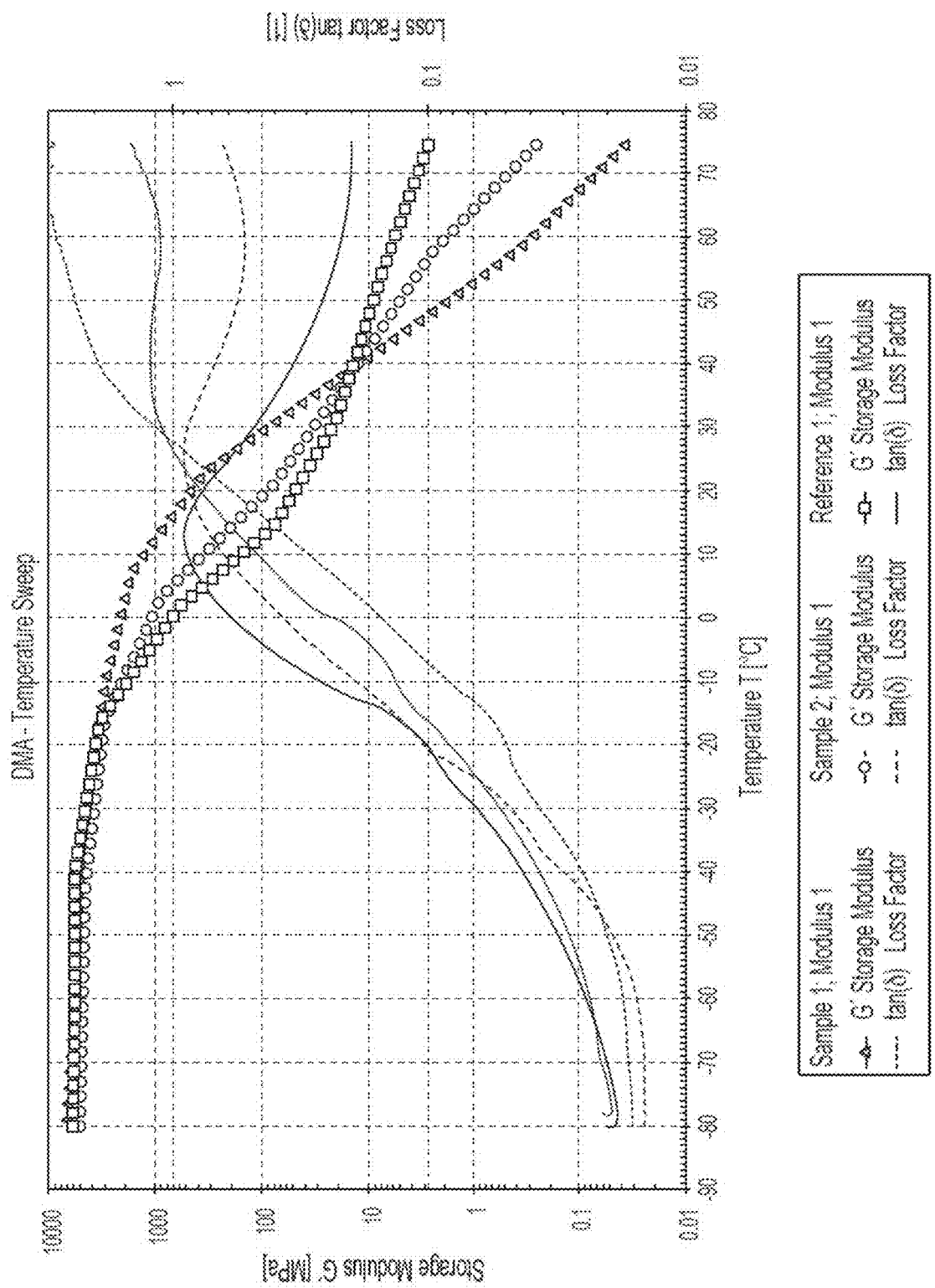
FIG. 10 shows a DMA plot for thermoplastic compositions described herein.
Figure 11:
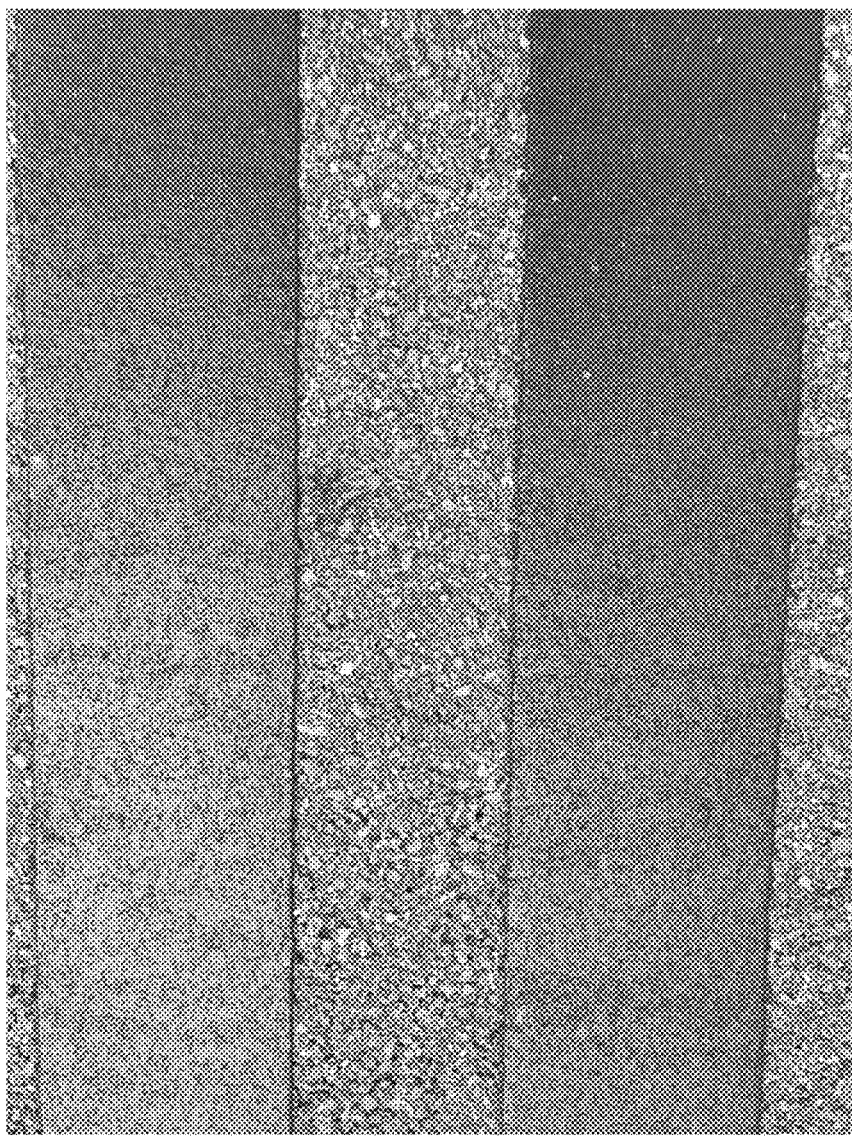
FIG. 11 shows a thermoplastic composition applied to a roadway surface.

Dynamic mechanical analysis (DMA) data was collected using an Anton Paar Rheometer with liquid nitrogen for consistent temperature control. DMA can measure the properties of materials as they are deformed under periodic stress. Samples were cut into rectangular prism shapes with typical dimensions of 40 mm×11 mm×3 mm. A constant oscillating strain while ramping the temperature at 2° C./min provided the modulus and tan δ values seen in FIG. 10. The reference for the DMA test was a thermoplastic with known performance in road markings. The triangle symbols show Sample 1 having the formulation as set forth in Example 1. The circle symbols show Sample 2 having the formulation as set forth in Example 5. The square symbols show the reference sample.

For roadway applications, two areas of the chart are of interest: 0-40° C. and 40-80° C. For 0-40° C., a lower storage modulus can indicate a composition is more flexible and therefore, more resistant to cracking. For 40-80° C., a higher storage modulus can indicate a composition is more resistant to deformation, which may occur on road markings due to compressive forces from vehicular traffic. While Sample 2 did not perform the same as the control sample, Sample 2 did exhibit a lower storage modulus in the 0-40° C. range as compared to Sample 1, and a higher storage modulus in the 40-80° C. range as compared to Sample 1.

EXAMPLE 7

A composition as described herein was applied to roadway surface comprising Superpave asphalt. Two lines of the composition were applied and topped with a layer of aggregate. A X-RITE Colori7 test was used to determine the level of gloss/matte of a given composition. A gloss measurement was conducted on the compositions provided in Examples 1 and 5, where test measured the amount of reflection (gloss) at a 60-degree angle of incidence. This is angle is generally representative of the angle a reflection observed by a driver on a highway. Table 3 provides the results.

TABLE 3

| X-RITE Colori7 Gloss | Sample 1 | Sample 2 |
|---|---|---|
| 60° angle of incidence | 8.00 units | 4.07 units |

Illustrative Embodiments of Suitable Compositions and Methods

As used below, any reference to methods, products, or systems is understood as a reference to each of those methods, products, or systems disjunctively (e.g., "Illustrative embodiment 1-4 is understood as illustrative embodiment 1, 2, 3, or 4.").

Illustrative embodiment 1 is a thermoplastic composition comprising:
  2 to 30 wt. % polyamide resin;
  up to 40 wt. % rosin-modified ester;
  up to 40 wt. % modified gum rosin;
  0.1 to 10 wt. % pigment;
  up to 20 wt. % wax;
  up to 10 wt. % plasticizer; and
  5 to 90 wt. % of at least one inorganic filler.

Illustrative embodiment 2 is the composition of any preceding or subsequent illustrative embodiment, wherein the pigment is carbon black.

Illustrative embodiment 3 is the composition of any preceding or subsequent illustrative embodiment, wherein the modified rosin ester comprises tall oil esters, maleic rosin ester, pentaerythritol rosin ester, glycerol rosin ester, disproportionated rosin ester, hydrogenated rosin, and polymerized rosin.

Illustrative embodiment 4 is the composition of any preceding or subsequent illustrative embodiment, wherein the copolymer comprises one or more of ethylene vinyl acetate and ethylene maleic anhydride.

Illustrative embodiment 5 is the composition of any preceding or subsequent illustrative embodiment, wherein the wax comprises polyethylene wax.

Illustrative embodiment 6 is the composition of any preceding or subsequent illustrative embodiment, further comprising:
  up to 10 wt. % copolymer;
  up to 3 wt. % antioxidant; and
  up to 3.5 wt. % light stabilizer.

Illustrative embodiment 7 is the composition of any preceding or subsequent illustrative embodiment, wherein the light stabilizer comprises a hindered amine.

Illustrative embodiment 8 is the composition of any preceding or subsequent illustrative embodiment, wherein the plasticizer comprises one or more of castor oil and di-isononyl phthalate.

Illustrative embodiment 9 is the composition of any preceding or subsequent illustrative embodiment, wherein the inorganic filler comprises one or more of calcium carbonate, silica, quartzite, marble grit, glass powder, glass cullet, and alumina.

Illustrative embodiment 10 is the composition of any preceding or subsequent illustrative embodiment, wherein the modified gum rosin comprises one or more of glyceryl hydrogenated rosin, rosin modified phenolic resin, pentaerythrityl rosin, glyceryl rosin, disproportionated rosin, polymerized rosin or hydrogenated rosin.

Illustrative embodiment 11 is the composition of any preceding or subsequent illustrative embodiment, wherein the composition has a viscosity of 1,000 to 50,000 cP, wherein the viscosity is measured at 425° F. with a Brookfield Viscometer at 6 rpm, #4 or #64 spindle.

Illustrative embodiment 12 is the composition of any preceding or subsequent illustrative embodiment, wherein the composition has a viscosity of 1,000 to 10,000 cP, wherein the viscosity is measured at 425° F. with a Brookfield Viscometer at 60 rpm, #4 or #64 spindle.

Illustrative embodiment 13 is the composition of any preceding or subsequent illustrative embodiment, wherein the composition has a specific gravity of 1.6 to 2.1.

Illustrative embodiment 14 is the composition of any preceding or subsequent illustrative embodiment, wherein the composition has a hardness of 5 to 75 units measured with 1 kg at 115° F. and shore A durometer.

Illustrative embodiment 15 is the composition of any preceding or subsequent illustrative embodiment, wherein the composition has softening point of 200 to 260° F.

Illustrative embodiment 16 is the composition of any preceding or subsequent illustrative embodiment, wherein the composition has elongation of at least 20 percent.

Illustrative embodiment 17 is the composition of any preceding or subsequent illustrative embodiment, wherein the thermoplastic composition is applied to a roadway comprising a first asphalt and a second asphalt to form a barrier over a longitudinal joint that is substantially parallel to and located between the first asphalt and the second asphalt, and wherein the thermoplastic composition seals an edge between the first asphalt and the second asphalt from deterioration.

Illustrative embodiment 18 is a method of making a thermoplastic composition, the method comprising:
  adding a wax to the vessel;
  adding a polyamide resin to the vessel;
  adding a plasticizer to the vessel;
  adding at least one of a modified rosin ester or a modified gum rosin to a vessel;
  adding a first charge of an inorganic filler to the vessel;
  adding a second charge of an inorganic filler to the vessel; and mixing the composition.

Illustrative embodiment 19 is the method of any preceding or subsequent illustrative embodiment, further comprising heating the vessel to 340 to 450° F.

Illustrative embodiment 20 is the method of any preceding or subsequent illustrative embodiment, further comprising
  adding a copolymer to the vessel;
  adding an antioxidant to the vessel; and
  adding a light stabilizer to the vessel.

Illustrative embodiment 21 is the method of any preceding or subsequent illustrative embodiment, further comprising adding a second copolymer to the vessel after the polyamide resin addition.

Illustrative embodiment 22 is a method of sealing roadway joints, the method comprising: heating a thermoplastic composition of claim 1 to 340 to 450° F., wherein the thermoplastic composition is mixed during the heating, wherein the mixing is performed by at least one of auger, agitation, or recirculation; and applying the heated thermoplastic composition to an asphalt roadway joint, wherein the thermoplastic composition is applied by extruding, spraying, or other application means to the asphalt roadway joint, wherein the asphalt roadway joint comprises a longitudinal joint that is substantially parallel to and located between adjacent lanes of an asphalt roadway.

Illustrative embodiment 23 is the method of any preceding or subsequent illustrative embodiment, further comprising applying an aggregate to the applied thermoplastic composition.

While this specification describes the composition being applied to a roadway, a person of ordinary skill in the art would understand that the compositions can be applied to other substrates. Some non-limiting examples of substrates include pavement, roads, parking lots, parking decks, parking blocks, traffic blocks, ramps, bridges, airport runways, docks, tunnels, sidewalks, parks, plazas, green spaces, decorative spaces, floor surfaces, walls, ceilings, and doors. Typical but non-limiting examples of substrate materials include asphalt, concrete, and cement.

As used herein, the terms "invention," "the invention," "this invention" and "the present invention" are intended to refer broadly to all of the subject matter of this patent application and the claims below. Statements containing these terms should be understood not to limit the subject matter described herein or to limit the meaning or scope of the patent claims below. The terms "comprising," "having," "including," and "containing" are to be construed as open-ended terms (i.e., meaning "including, but not limited to") unless otherwise noted.

As used herein, the meaning of "a," "an," and "the" includes singular and plural references unless the context clearly dictates otherwise.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Additionally, any reference referred to as being "incorporated herein" is to be understood as being incorporated in its entirety.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without That which is claimed:

1. A thermoplastic composition comprising:
2 to 30 wt. % polyamide resin;
up to 40 wt. % modified rosin ester;
up to 40 wt. % modified gum rosin;
0.1 to 10 wt. % pigment;
up to 20 wt. % wax;
less than 10 wt. % plasticizer; and
5 to 90 wt. % of at least one inorganic filler,
wherein the pigment is carbon black.

2. The thermoplastic composition of claim 1, wherein the modified rosin ester comprises tall oil esters, maleic rosin ester, pentaerythritol rosin ester, glycerol rosin ester, disproportionated rosin ester, hydrogenated rosin, and polymerized rosin.

3. The thermoplastic composition of claim 1, wherein the wax comprises polyethylene wax.

4. The thermoplastic composition of claim 1, wherein the plasticizer comprises one or more of castor oil and di-isononyl phthalate.

5. The thermoplastic composition of claim 1, further comprising:
up to 10 wt. % copolymer;
up to 3 wt. % antioxidant; and
up to 3.5 wt. % light stabilizer.

6. The thermoplastic composition of claim 5, wherein the copolymer comprises one or more of ethylene vinyl acetate and ethylene maleic anhydride.

7. The thermoplastic composition of claim 5, wherein the light stabilizer comprises a hindered amine.

8. The thermoplastic composition of claim 1, wherein the modified gum rosin comprises one or more of glyceryl hydrogenated rosin, rosin modified phenolic resin, pentaerythrityl rosin, glyceryl rosin, disproportionated rosin, polymerized rosin or hydrogenated rosin.

9. The thermoplastic composition of claim 1, wherein the composition has a viscosity of 1,000 to 50,000 cP, wherein the viscosity is measured at 425° F. with a Brookfield Viscometer at 6 rpm, #4 or #64 spindle.

10. The thermoplastic composition of claim 1, wherein the composition has a specific gravity of 1.6 to 2.1.

11. The thermoplastic composition of claim 1, wherein the composition has a hardness of 5 to 75 units measured with 1 kg at 115° F. and shore A durometer.

12. The thermoplastic composition of claim 1, wherein the composition has softening point of 200° F. to 260° F.

13. The thermoplastic composition of claim 1, wherein the composition has elongation of at least 20 percent.

14. A thermoplastic composition comprising:
2 to 30 wt. % polyamide resin;
up to 40 wt. % modified rosin ester;
up to 40 wt. % modified gum rosin;
0.1 to 10 wt. % pigment;
up to 20 wt. % wax;
less than 10 wt. % plasticizer; and
5 to 90 wt. % of at least one inorganic filler,
wherein the pigment is carbon black, and
wherein the thermoplastic composition is applied to a roadway comprising a first asphalt and a second asphalt to form a barrier over a longitudinal joint that is substantially parallel to and located between the first asphalt and the second asphalt, wherein the thermoplastic composition seals an edge between the first asphalt and the second asphalt from deterioration.

15. A method of sealing roadway joints with a thermoplastic composition, the method comprising:
adding a wax to a vessel;
adding a polyamide resin to the vessel;
adding a plasticizer to the vessel;
adding at least one of a modified rosin ester or a modified gum rosin to the vessel;
adding a pigment comprising carbon black to the vessel;
adding at least one inorganic filler to the vessel;
mixing the composition;
heating the vessel to 340° F. to 450° F.; and
applying the composition to a roadway to seal a roadway joint.

16. The method of claim 15, further comprising:
adding a copolymer to the vessel;
adding an antioxidant to the vessel; and
adding a light stabilizer to the vessel.

17. The method of claim 16, further comprising:
adding a second copolymer to the vessel after the polyamide resin addition.

18. A method of sealing roadway joints, the method comprising:
heating a thermoplastic composition to 340° F. to 450° F., wherein the thermoplastic composition comprises:
2 to 30 wt. % polyamide resin;
up to 40 wt. % modified rosin ester;
up to 40 wt. % modified gum rosin;
0.1 to 10 wt. % pigment;
up to 20 wt. % wax;
less than 10 wt. % plasticizer; and
5 to 90 wt. % of at least one inorganic filler,
wherein the thermoplastic composition is mixed during the heating, wherein the mixing is performed by at least one of auger, agitation, or recirculation, and wherein the pigment comprises carbon black; and
applying the heated thermoplastic composition to an asphalt roadway joint of an asphalt roadway, wherein the thermoplastic composition is applied by extruding, spraying, or other application means to the asphalt roadway joint, wherein the asphalt roadway joint comprises a longitudinal joint that is substantially parallel to and located between adjacent lanes of the asphalt roadway.

19. A method of sealing roadway joints comprising:
applying the thermoplastic composition of claim 1 to a roadway to seal a roadway joint.

* * * * *